US012786008B2

(12) United States Patent
Teng et al.

(10) Patent No.: US 12,786,008 B2
(45) Date of Patent: Nov. 3, 2026

(54) ROUTER DEVICE AND METHOD FOR CONFIGURING NETWORK FUNCTION THEREOF

(71) Applicant: ASUSTek COMPUTER INC., Taipei City (TW)

(72) Inventors: Wei-Sheng Teng, Taipei City (TW); Hsin-Ping Kang, Taipei City (TW)

(73) Assignee: ASUSTek COMPUTER INC., Taipei City (TW)

( * ) Notice: Subject to any disclaimer, the term of this patent is extended or adjusted under 35 U.S.C. 154(b) by 37 days.

(21) Appl. No.: 19/076,923

(22) Filed: Mar. 11, 2025

(65) Prior Publication Data

US 2025/0350496 A1 Nov. 13, 2025

(30) Foreign Application Priority Data

May 9, 2024 (TW) ................................ 113117172

(51) Int. Cl.
*H04L 12/46* (2006.01)
*H04L 41/40* (2022.01)

(52) U.S. Cl.
CPC .......... *H04L 12/4641* (2013.01); *H04L 41/40* (2022.05)

(58) Field of Classification Search
CPC ...... H04L 12/4641; H04L 41/40; H04L 12/46
See application file for complete search history.

(56) References Cited

U.S. PATENT DOCUMENTS

| | | | | |
|---|---|---|---|---|
| 9,525,636 | B2 * | 12/2016 | Djekic | H04L 47/6215 |
| 2001/0049738 | A1 | 12/2001 | Doi | |
| 2018/0041436 | A1 * | 2/2018 | Zhang | H04L 12/4633 |
| 2018/0316799 | A1 * | 11/2018 | Shaw | H04L 12/14 |
| 2022/0255867 | A1 * | 8/2022 | Arrobo Vidal | H04W 28/0268 |
| 2024/0284238 | A1 * | 8/2024 | Rossbach | H04W 28/0252 |
| 2026/0019353 | A1 * | 1/2026 | Pateromichelakis | H04L 43/0817 |

FOREIGN PATENT DOCUMENTS

| | | |
|---|---|---|
| CN | 1326307 | 12/2001 |
| CN | 101977146 | 2/2011 |
| CN | 103166854 B | 3/2017 |
| CN | 108566286 | 9/2018 |

* cited by examiner

*Primary Examiner* — Tonia L Dollinger
*Assistant Examiner* — Mehulkumar J Shah
(74) *Attorney, Agent, or Firm* — JCIPRNET

(57) ABSTRACT

A router device and a method for configuring network function thereof are provided. The method adapted to the router device includes the following steps. A virtual local area network is established for a network application scenario. When a terminal device is connected to the router device, the terminal device is determined to be belonging to the virtual local area network based on the connection information of the terminal device. A quality of service (QOS) setting and a multi-link operation (MLO) mode of the virtual local area network are configured based on device information and application information of the terminal device. A network service server for the virtual local area network is assigned.

18 Claims, 7 Drawing Sheets

ROUTER DEVICE AND METHOD FOR CONFIGURING NETWORK FUNCTION THEREOF

CROSS-REFERENCE TO RELATED APPLICATION

This application claims the priority benefit of Taiwan application serial no. 113117172, filed on May 9, 2024. The entirety of the above-mentioned patent application is hereby incorporated by reference herein and made a part of this specification.

BACKGROUND

Technical Field

The disclosure relates to a router device and a method for configuring network function thereof.

Description of Related Art

Traditionally, when users need to set Quality of Service (QoS) and other various network functions on routers, they often face a series of challenges and difficulties, which usually require users' time and effort. In particular, for ordinary users, the setting of QoS requires a certain level of technical knowledge and experience. Therefore, it is quite difficult for users who lack the corresponding skills or knowledge to set various network functions on the router. Moreover, it is often difficult for users to accurately assess their needs, leading to suboptimal QoS settings. In addition, for the various network function settings of the router, users need to enter separate setting interfaces for different network functions to set them individually, making the operation steps cumbersome and time-consuming.

SUMMARY

This disclosure provides a method for configuring network function, which is adapted to a router device and includes the following steps. A virtual local area network (VLAN) for a network application scenario is established. When a terminal device is connected to the router device, the terminal device belongs to the virtual local area network is determined based on the connection information of the terminal device. A quality of service (QoS) setting and a multi-link operation (MLO) mode of the virtual local area network is configured based on device information and application information of the terminal device. A network service server of the virtual local area network is assigned.

The disclosure further provides a router device, which includes a transceiver, a storage device, and a processor. The processor couples the transceiver and the storage device, and is configured to perform the following operations. A virtual local area network (VLAN) for a network application scenario is established. When a terminal device is connected to the router device, the terminal device belongs to the virtual local area network is determined based on the connection information of the terminal device. A quality of service (QoS) setting and a multi-link operation (MLO) mode of the virtual local area network is configured based on device information and application information of the terminal device. A network service server of the virtual local area network is assigned.

Based on the above, in the embodiments of the disclosure, the router device may establish a virtual local area network for a network application scenario, and may independently and adaptively configure the QoS setting, the MLO mode and the network service server of this virtual local area network. In this way, when the terminal device chooses to connect to the virtual local area network corresponding to the network application scenario, the terminal device may obtain network service quality that meets the needs of the network application scenario. In other words, users do not need to perform cumbersome network configuration operations on the router device. Instead, the terminal device may achieve the desired network quality by connecting to a particular VLAN.

DESCRIPTION OF THE EMBODIMENTS

Figure 1:
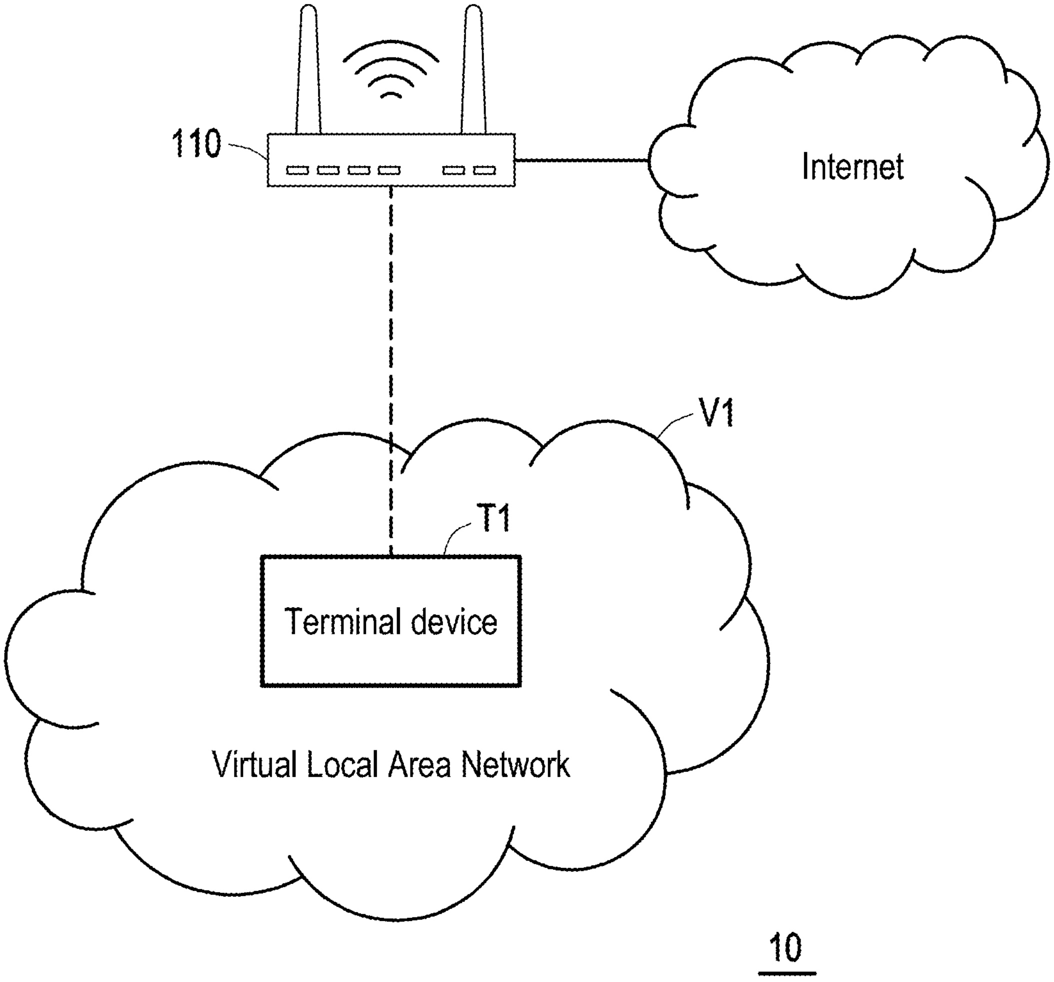
FIG. 1 is a schematic diagram of a network system according to an embodiment of the disclosure.

Reference will now be made in detail to the exemplary embodiments of the present invention, examples of which are illustrated in the accompanying drawings. Whenever possible, the same component symbols are used in the drawings and descriptions to represent the same or similar parts. These embodiments are only part of the present invention and do not disclose all possible implementations of the present invention. Rather, these embodiments are merely examples of devices and methods within the scope of the patent application of the present invention.

Referring to FIG. 1, which is a schematic diagram of a network system according to an embodiment of the disclosure. The network system 10 may include a router device 110 and a terminal device T1. The terminal device T1 may be connected to the Internet through the router device 110. In some embodiments, the router device 110 may be connected to the Internet via a modem of an Internet Service Provider (ISP) or a fiber optic converter. In some embodiments, the modem of the ISP may be integrated into the router device 110. The terminal device T1 may be connected to the router device 110 wired or wirelessly. For example, the router device 110 may be a wireless router that complies with the Wi-Fi protocol, and the terminal device T1 may establish a connection with the router device 110 based on the Wi-Fi protocol. In some embodiments, when the terminal device T1 establishes a wireless connection with the router device 110, the router device 110 may use 2.4 GHz, 5 GHz, 6 GHz frequency bands or combinations thereof to perform wireless communication with the terminal device T1. Alternatively, in some embodiments, the terminal device T1 may be connected to a physical port (e.g., a local area network port (LAN port)) of the router device 110 via a cable.

In some embodiments, the terminal device T1 is, for example, a smartphone, a tablet computer, a game console, a notebook computer, a desktop computer, a smart home appliance, an Internet of Things device, etc. This disclosure is not limited thereto. The terminal device T1 may be connected to the Internet by connecting to the router device 110.

In some embodiments, the router device 110 may support the ability to divide a physical local area network into one or more virtual local area networks (VLANs) (e.g., virtual local area network V1). For example, the router device 110 may establish the virtual local area network V1 based on IEEE 802.11q standard. The IEEE 802.11q standard defines methods for implementing virtual local area networks. Through the IEEE 802.11q standard, the router device 110 may implement VLAN segmentation and management in the network, thereby improving the security and flexibility of the network.

Based on this, the router device 110 may establish a virtual local area network V1 for a specific network application scenario (such as a game application scenario), and the router device 110 may automatically configure appropriate QoS settings, MLO mode and the network service server for the virtual local area network V1, so that the terminal device T1 in the virtual local area network V1 may obtain network connection quality that meets the needs of the network application scenarios. Therefore, the user does not need to enter various operation interfaces to manually configure the QoS settings, MLO mode and network service server of the router device 110, which greatly simplifies the steps of setting the router device 110.

Figure 2:
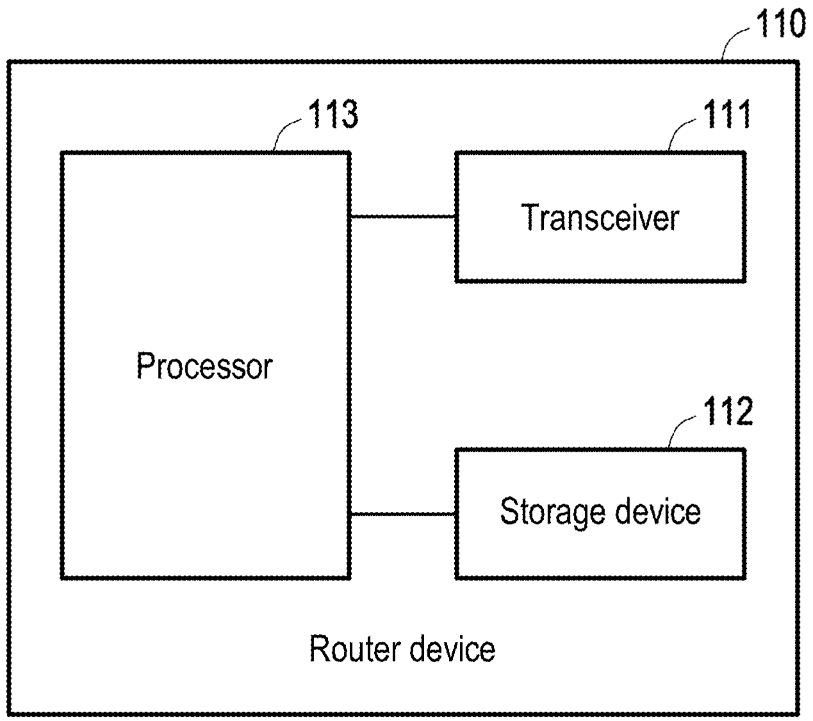
FIG. 2 is a schematic diagram of a router device according to an embodiment of the disclosure.

Referring to FIG. 2, which is a schematic diagram of a router device according to an embodiment of the disclosure. The router device 110 may include a transceiver 111, a storage device 112 and a processor 113. The processor 113 couples the transceiver 111 and the storage device 112.

The transceiver 111 may transmit and receive signals wirelessly or wired. A transceiver may also perform operations such as low-noise amplification, impedance matching, frequency mixing, up or down frequency conversion, filtering, amplification, and similar operations. The router device 110 may receive and send data through the transceiver 111. In some embodiments, the router device 110 may also include an antenna (not shown).

The storage device 112 is configured to store files, instructions, program codes, software modules, etc., which may be, for example, any type of fixed or removable random access memory (RAM) or read-only memory (ROM), flash memory or other similar devices, integrated circuits, or combinations thereof.

The processor 113 is, for example, a programmable general-purpose or special-purpose microprocessor, a digital signal processor (DSP), a programmable controller, and an Application Specific Integrated Circuits (ASIC), a Programmable Logic Device (PLD) or other similar devices or a combination of these devices.

The processor 113 may execute the program codes, software/firmware modules, instructions, etc. recorded in the storage device 112 to implement the method for configuring network function in the embodiment of the disclosure. In other words, the processors 113 may be configured to perform respective corresponding operations described below.

Figure 3:
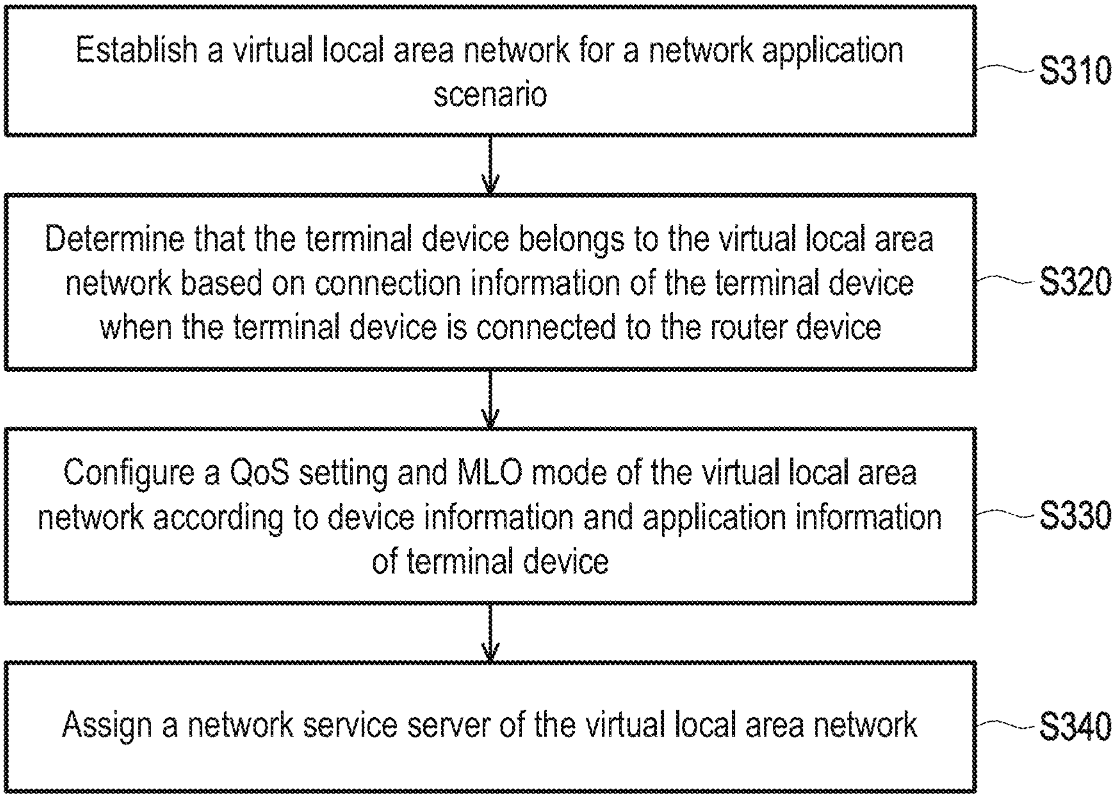
FIG. 3 is a flowchart of a method for configuring network function according to an embodiment of the disclosure.

Referring to FIG. 3, which is a flowchart of a method for configuring network function according to an embodiment of the disclosure. In step S310, the processor 113 may establish a virtual local area network V1 for a network application scenario. In some embodiments, the processor 113 may determine the service set identifier (SSID) of the virtual local area network V1 and establish a virtual local area network corresponding to the SSID. In some embodiments, the processor 113 may determine a local area network (LAN) port of the virtual local area network V1 and establish the virtual local area network V1 corresponding to the LAN port. For example, the user may enter the router management interface of the router device 110 and create a virtual local area network V1 corresponding to an SSID and/or LAN port through the router management interface.

Figure 4:
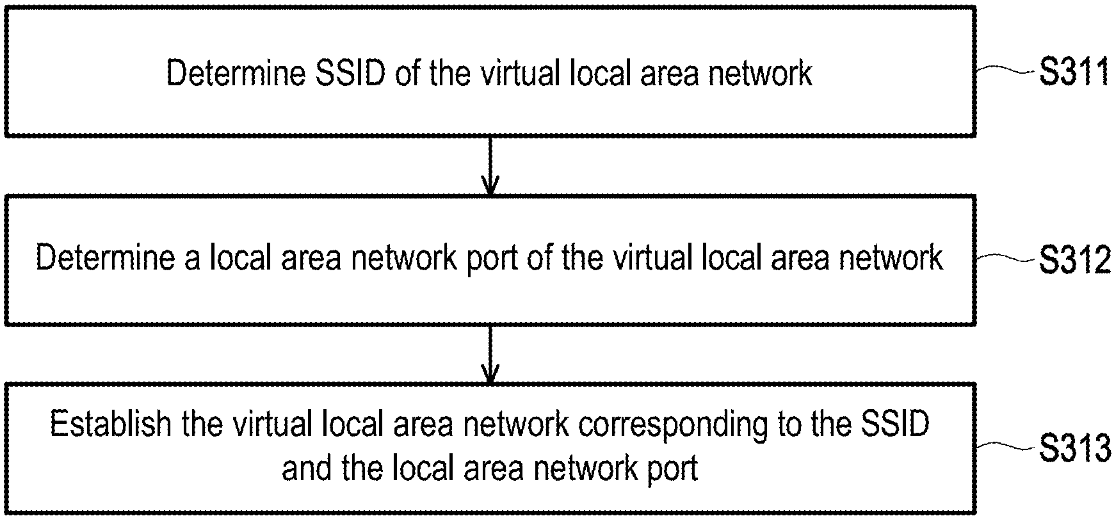
FIG. 4 is a flowchart of establishing a virtual local area network according to an embodiment of the disclosure.

Referring to FIG. 4, which is a flowchart of establishing a virtual local area network according to an embodiment of the disclosure. In step S311, the processor 113 may determine the SSID of the virtual local area network V1. The processor 113 may set an SSID and a password of a wireless access network to generate a virtual local area network V1 corresponding to the SSID. In step S312, the processor 113 may determine the LAN port of virtual local area network V1. The processor 113 may optionally associate at least one of the plurality of LAN ports of the router device 110 to the virtual local area network V1. In step S313, the processor 113 may establish virtual local area network V1 corresponding to the SSID and the LAN port. That is, the processor 113 may assign multiple terminal devices connected to the router device 110 via the same SSID to the same virtual local area network. In addition, the processor 113 may assign multiple terminal devices connected to the router device 110 via the same SSID and multiple terminal devices wired to the router device 110 via specific LAN ports to the same virtual local area network V1.

Returning to FIG. 3. In step S320, when the terminal device T1 is connected to the router device 110, the processor 113 may determine that the terminal device T1 belongs to the virtual local area network V1 based on the connection information of the terminal device T1. As mentioned above, virtual local area network V1 corresponds to a dedicated SSID and one or more LAN ports assigned by the user. Therefore, the processor 113 may determine whether the terminal device T1 belongs to the virtual local area network V1 based on the SSID used by the terminal device T1 or the connected area network port used by the terminal device T1. For example, as shown in FIG. 1, the terminal device T1 uses the SSID corresponding to the virtual local area network V1 to connect to the router device 110, so the processor 113 may determine that the terminal device T1 belongs to the virtual local area network V1. Alternatively, the terminal device T1 is connected to the LAN port corresponding to the virtual local area network V1 via a cable, so the processor 113 may determine that the terminal device T1 belongs to the virtual local area network V1.

In step S330, the processor 113 may configure a QoS setting and MLO mode of virtual local area network V1 according to device information and application information of terminal device T1. Specifically, when the terminal device T1 is connected to the router device 110, the processor 113 may collect the device information and the application information of the terminal device T1 by analyzing packets of the terminal device T1. Afterwards, based on the device information and the application information of the terminal device T1, the processor 113 may determine the QoS setting and MLO mode of the virtual local area network V1 based on the configuration policy corresponding to the network application scenario.

For example, assuming the network application scenario is a gaming scenario and the terminal device T1 is running a gaming application along with other applications, the processor 113 may configure the gaming application with high priority based on the gaming scenario. The processor 113 may allocate a larger first available bandwidth to the gaming application and a smaller second available bandwidth to the other applications. In addition, assuming the network application scenario is a gaming scenario and the terminal device T1 is running other applications without running a gaming application, the processor 113 may allocate a third available bandwidth to the other applications, which is greater than the second available bandwidth.

In some embodiments, the device information of the terminal device T1 includes the hardware model of the network component, the firmware information of the network component, the brand information of the network component, a network performance indicator, or a combination thereof. The network component may be a network card or a network chip, etc. The network performance indicator may be, for example, data rate, signal strength, signal-to-noise ratio (SNR), packet loss rate, latency or interference level and so on.

In some embodiments, the processor 113 may confirm whether the terminal device T1 supports the MLO function and the Wi-Fi Multimedia QoS (WMM QoS) protocol based on the hardware model of the network component, the firmware information of the network component, or the brand information of the network component. When the processor 113 determines that the terminal device T1 supports the MLO function and the WMM QoS protocol, the processor 113 may set the MLO mode and QoS settings applied to the virtual local area network V1, so that the MLO mode and QOS settings, which are operated by the router device 110 based on virtual local area network V1, are compatible with the hardware specifications of the terminal device T1.

In some embodiments, the application information of the terminal device T1 includes an executing application list, an application category, a packet destination of the application, or a combination thereof. Specifically, the processor 113 may determine the application program currently being executed by the terminal device T1 according to the packet sent by the terminal device T1. Afterwards, the processor 113 may configure the QoS settings of the virtual local area network V1 based on the network application scenario, such as configuring the upload bandwidth limit and download bandwidth limit for the application program being executed by the terminal device T1.

In some embodiments, the processor 113 may set the MLO mode of virtual local area network V1 based on a network performance indicator and application information. In some embodiments, the MLO mode may be set to synchronous transmit and receive (simultaneously TX and RX, STR) mode, non-simultaneous transmit and receive (non-simultaneous TX and RX, NSTR) mode, multi-link multi-radio (MLMR) mode or multi-link single radio (MLSR) mode, or enhanced Multi-Link-Single-Radio (eMLSR) mode.

In step S340, the processor 113 may assign a network service server of virtual local area network V1. In some embodiments, the processor 113 may assign the network service server of the virtual local area network V1 according to the location information or ISP of the terminal device T1. This network service server includes a Domain Name Service (DNS) server or a Virtual Private Network (VPN) server.

Figure 5:
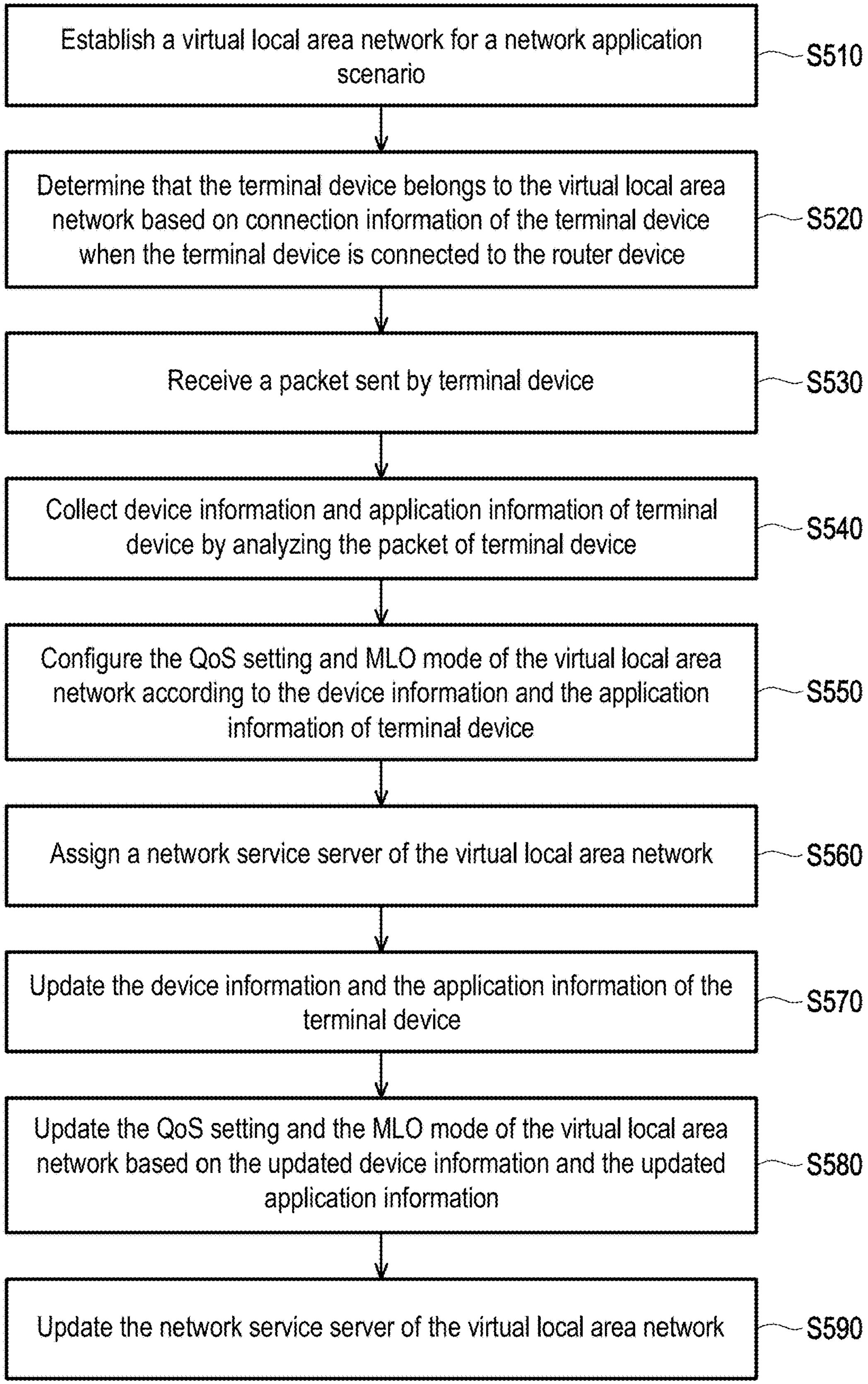
FIG. 5 is a flowchart of a method for configuring network function according to an embodiment of the disclosure.

Referring to FIG. 5, which is a flowchart of a method for configuring network function according to an embodiment of the disclosure. In step S510, the processor 113 may establish a virtual local area network V1 for a network application scenario. In step S520, when the terminal device T1 is connected to the router device 110, the processor 113 may determine that the terminal device T1 belongs to the virtual local area network V1 based on the connection information of the terminal device T1. The implementation manner and details of the above steps S510 to S520 have been described in detail in the previous embodiments, and are not be described again here.

In step S530, the processor 113 may receive the packet sent by terminal device T1. In step S540, by analyzing the packet of terminal device T1, the processor 113 may collect device information and application information of terminal device T1. The processor 113 may use deep packet inspection (DPI) technology to analyze the packets of the terminal device T1. The processor 113 may obtain the device information and the application information of the terminal device T1 by analyzing the packets of the terminal device T1.

In step S550, the processor 113 may configure the QoS setting and the MLO mode of virtual local area network V1 according to the device information and the application information of terminal device T1. In step S560, the processor 113 may assign the network service server of virtual local area network V1. The implementation and details of the above steps S550 to S560 have been described in detail in the previous embodiments, and will not be described again here.

In some embodiments, the processor 113 may dynamically update the QoS settings, MLO mode and network service server of the virtual local area network V1 regularly or irregularly. Since the overall network environment and the way users use the Internet may be changed, the device information and application information of terminal device T1 may also change accordingly. In this case, processor 113 may use the updated device information and updated application information to reconfigure the QoS settings and MLO mode and network service server of virtual local area network V1.

In step S570, the processor 113 may update the device information and the application information of terminal device T1. In step S580, the processor 113 may update the QoS setting and the MLO mode of virtual local area network V1 based on the updated device information and updated application information. In step S580, the processor 113 may update the network service server of virtual local area network V1. That is to say, the processor 113 may dynamically adjust the QoS setting and MLO mode of the local network V1 so that the adjusted QoS setting and MLO mode may be maintained to suit the user's network requirements.

Figure 6:
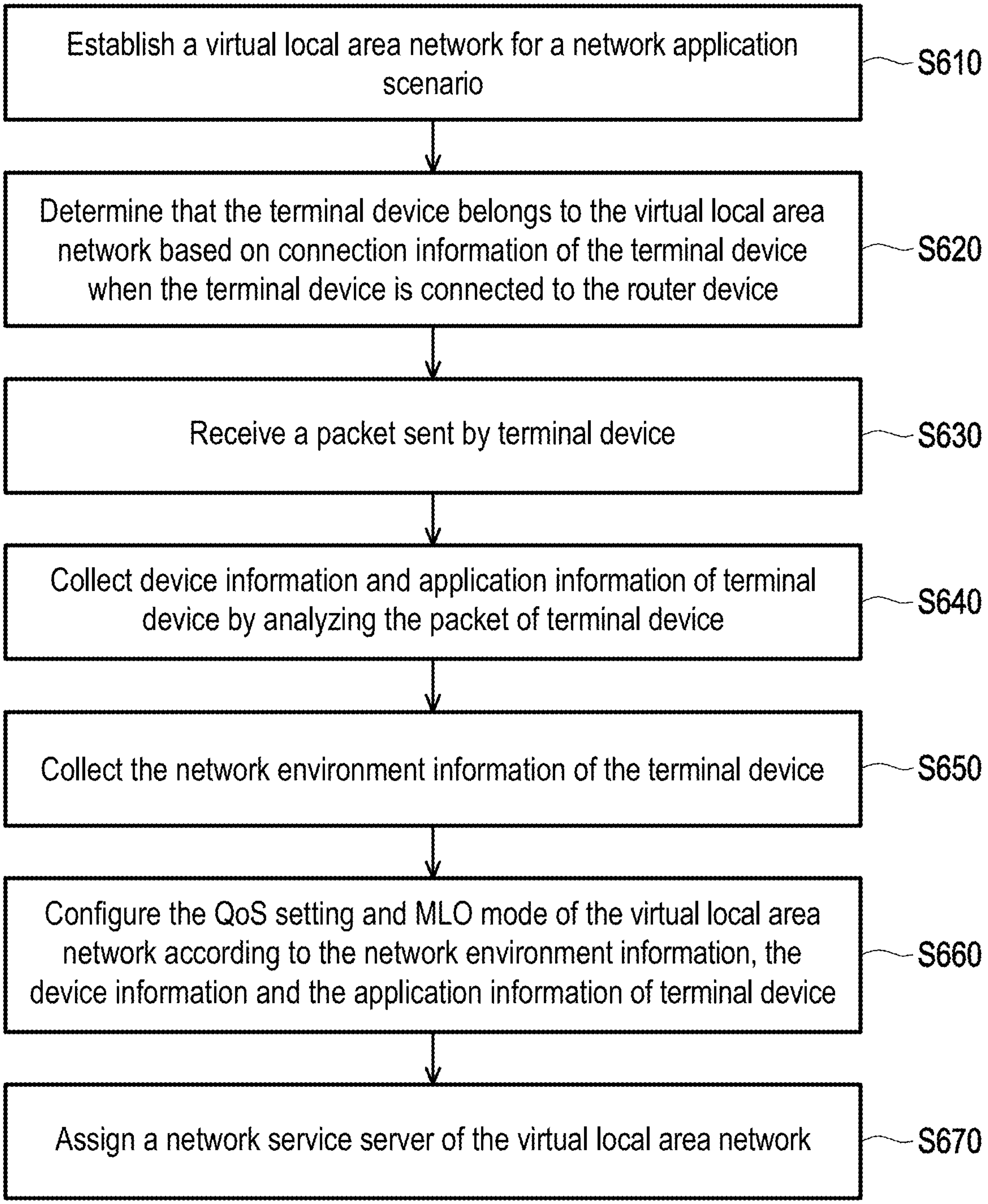
FIG. 6 is a flowchart of a method for configuring network function according to an embodiment of the disclosure.

Referring to FIG. 6, which is a flowchart of a method for configuring network function according to an embodiment of the disclosure. In step S610, the processor 113 may establish a virtual local area network V1 for a network application scenario. In step S620, when the terminal device is connected to the router device, the processor 113 may determine that the terminal device T1 belongs to the virtual local area network V1 based on the connection information of the terminal device T1. In step S630, the processor 113 may receive the packet sent by terminal device T1. In step S640, by analyzing packets of the terminal device, the processor 113 may collect device information and the application information of the terminal device. The implementation and details of the above steps S610 to S640 have been described in detail in the previous embodiments, and will not be described again here.

Different from the previous embodiment, in step S650, the processor 113 may collect the network environment information of the terminal device T1. As the router device 110 may provide network connection services for many other terminal devices besides terminal device T1, the router device 110 may collect network environment information of terminal device T1, such as the presence of other terminal devices around terminal device T1 and the network usage status of those other terminal devices.

In step S660, the processor 113 may configure the QoS setting and the MLO mode of the virtual local area network V1 based on the network environment information, the device information and the application information of the terminal device T1. For example, when there are many other terminal devices around the terminal device T1 that may interfere with wireless communication, the processor 113 needs to enable the MLO function and set the MLO mode to the eMLSR mode or the STR mode. In step S670, the processor 113 may assign the network service server of virtual local area network V1. For example, the processor 113 may perform connection testing against multiple default VPN servers and assign one of the default VPN servers as the VPN server for virtual local area network V1.

In some embodiments, the router device 110 may also upload the collected information (device information and/or application information) to an inference server to obtain inference results about network environment information from the inference server. For example, the processor 113 may collect information about the types, quantities, and other relevant information of other networked devices (such as home appliances or mobile phones) connected to router 110, and upload the types, quantities, and other relevant information of other networked devices to an inference server. Based on the types, quantities, and other relevant information of these networked devices, the inference server may predict the network traffic of these networked devices at specific time points. Consequently, the router device 110 may configure the QoS setting and MLO mode of VLAN V1 based on the inference results provided by the inference server (such as the network traffic of multiple networked devices at specific time points). It is worth mentioning that, the inference server may use different inference models based on different network application scenarios.

Figure 7:
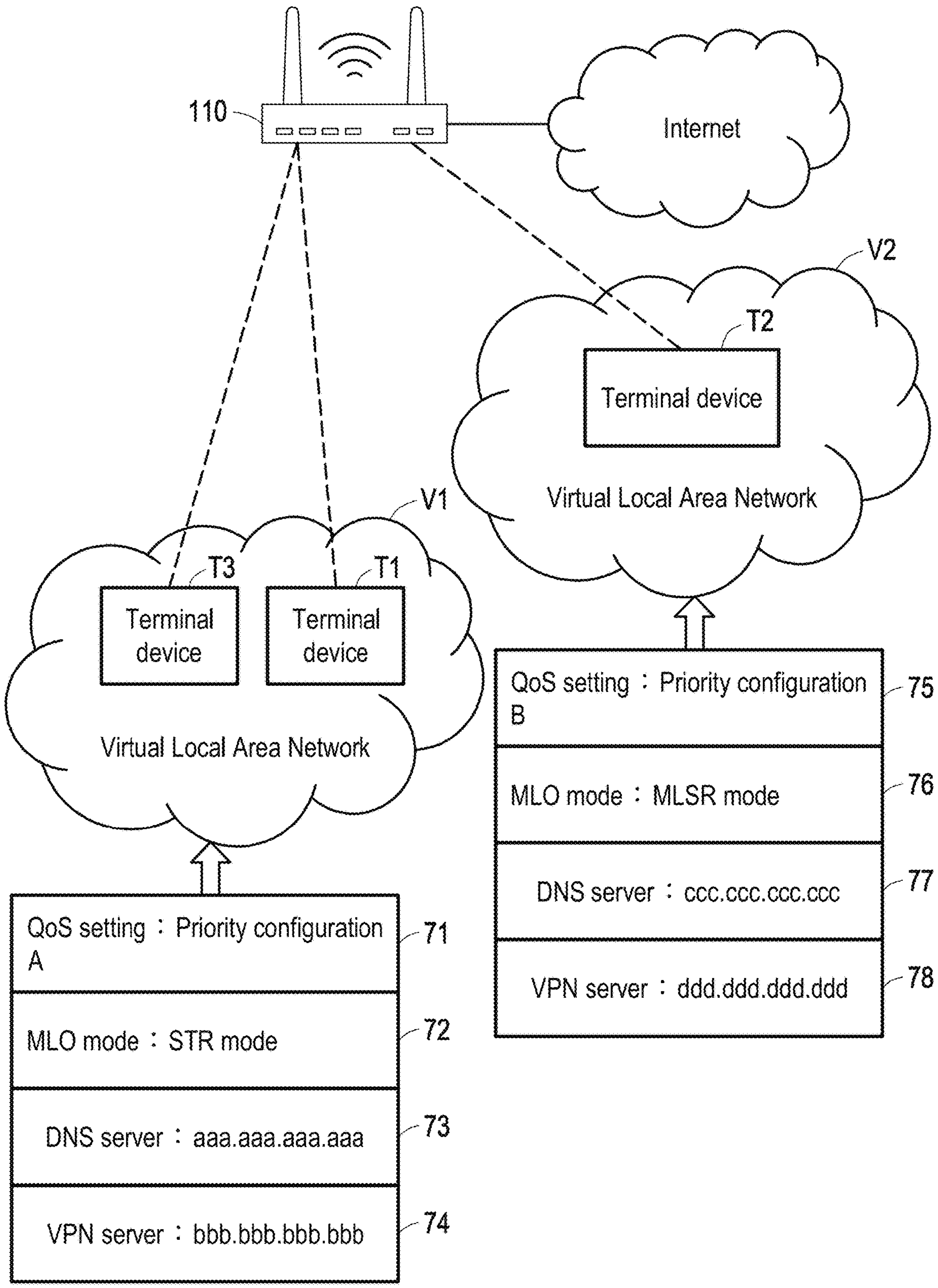
FIG. 7 is a schematic diagram of independently configuring different settings for different virtual local area networks according to an embodiment of the disclosure.

Referring to FIG. 7, which is a schematic diagram of independently configuring different settings for different virtual local area networks according to an embodiment of the disclosure. In this embodiment, the router device 110 may establish two virtual local area networks V1 and V2. The terminal device T1 and the terminal device T3 may use the same SSID to establish a wireless connection with the router device 110. Therefore, terminal device T1 and terminal device T3 may be assigned to the same virtual local area network V1. Therefore, the router device 110 may process the packet flows of the terminal device T1 and the terminal device T3 according to the QoS setting 71, the MLO mode 72, the DNS server 73, and the VPN server 74, so that the terminal device T1 and the terminal device T3 may obtain similar network connection quality.

In addition, the terminal device T2 may use another SSID to establish a wireless connection with the router apparatus 110. Therefore, terminal device T2 may be assigned to the virtual local area network V2. Therefore, the router device 110 may process the packet flow of the terminal device T2 according to the QOS setting 75, the MLO mode 76, the DNS server 77, and the VPN server 78.

Any contents of various embodiments of the disclosure, as well as any contents of the same embodiment, may be freely combined. Any combination of the above is within the scope of this disclosure. In addition, the processing procedures of the method for configuring network function executed by at least one processor are not limited to the above embodiment examples. For example, part of the above steps may be omitted, or each step may be executed in other order. In addition, any two or more of the above steps may be combined, and part of the steps may also be modified or deleted. Alternatively, in addition to the above-mentioned steps, other steps may also be executed.

In summary, in the embodiments of the disclosure, the router device may establish a virtual local area network for a network application scenario, and may independently and adaptively configure the QoS setting, the MLO mode and a network service server of this virtual local area network. In this way, when the terminal device chooses to connect to the virtual local area network corresponding to the network application scenario, the terminal device may obtain network service quality that meets the needs of the network application scenario. In other words, without performing cumbersome network configuration operations on the router device by the user, the terminal device is able to obtain ideal network quality by connecting to a specific virtual local area network.

Although the disclosure has been disclosed above in the form of exemplary embodiments, The is not intended to limit the disclosure. Anyone with ordinary knowledge in the relevant technical field may make slight changes and modifications without departing from the spirit and scope of the disclosure. Therefore, the protection scope of the disclosure shall be determined by the appended patent application scope and its equivalent scope.

What is claimed is:

1. A method for configuring network function, adapted to a router device and comprising:

establishing a virtual local area network for a network application scenario;

determining that a terminal device belongs to the virtual local area network based on connection information of the terminal device when the terminal device is connected to the router device;

configuring a quality of service (QoS) setting and a multi-link operation (MLO) mode of the virtual local area network according to device information and application information of the terminal device; and assigning a network service server of the virtual local area network.

2. The method for configuring network function according to claim 1, wherein the step of establishing the virtual local area network for the network application scenario comprises:

determining a Service Set Identifier (SSID) of the virtual local area network; and establishing the virtual local area network corresponding to the SSID.

3. The method for configuring network function according to claim 2, wherein the step of establishing the virtual local area network for the network application scenario further comprises:

determining a LAN port of the virtual local area network; and establishing the virtual local area network corresponding to the LAN port.

4. The method for configuring network function according to claim 1, further comprising:

receiving a packet sent by the terminal device; and collecting the device information and the application information of the terminal device by analyzing the packet of the terminal device.

5. The method for configuring network function according to claim 4, further comprising:

updating the device information and the application information of the terminal device; and updating the QOS setting and the MLO mode of the virtual local area network according to the updated device information and the updated application information.

6. The method for configuring network function according to claim 1, wherein the step of assigning the network service server of the virtual local area network comprises:

assigning the network service server of the virtual local area network based on location information of the terminal device or Internet Service Provider (ISP), wherein the network service server comprises a Domain Name Service (DNS) server or a Virtual Private Network (VPN) server.

7. The method for configuring network function according to claim 1, wherein the device information of the terminal device comprises a hardware model of a network component, firmware information of a network component, brand information of a network component, and a network performance indicator, or a combination thereof.

8. The method for configuring network function according to claim 1, wherein the application information of the terminal device comprises an execution application list, an application category, a packet destination of the application, or a combination thereof.

9. The method for configuring network function according to claim 1, wherein the step of configuring the QoS setting and a MLO mode of the virtual local area network according to the device information and the application information of the terminal device comprises:

collecting network environment information of the terminal device; and configuring the QoS setting and a MLO mode of the virtual local area network according to the network environment information, the device information and the application information of the terminal device.

10. A router device, comprising:

a transceiver;

a storage device; and a processor, coupled to the transceiver and the storage device, and configured to:

establish a virtual local area network for a network application scenario;

determine that a terminal device belongs to the virtual local area network based on connection information of the terminal device when the terminal device is connected to the router device;

configure a quality of service (QoS) setting and a multi-link operation (MLO) mode of the virtual local area network according to device information and application information of the terminal device; and assign a network service server of the virtual local area network.

11. The router device according to claim 10, wherein the processor is configured to:

determine a Service Set Identifier (SSID) of the virtual local area network; and establish the virtual local area network corresponding to the SSID.

12. The router device according to claim 11, wherein the processor is configured to:

determine a LAN port of the virtual local area network; and establish the virtual local area network corresponding to the LAN port.

13. The router device according to claim 10, wherein the processor is configured to:

receive a packet sent by the terminal device; and collect the device information and the application information of the terminal device by analyzing the packet of the terminal device.

14. The router device according to claim 13, wherein the processor is configured to:

update the device information and the application information of the terminal device; and update the QoS setting and the MLO mode of the virtual local area network according to the updated device information and the updated application information.

15. The router device according to claim 10, wherein the processor is configured to:

assign the network service server of the virtual local area network based on location information of the terminal device or Internet Service Provider (ISP), wherein the network service server comprises a Domain Name Service (DNS) server or a Virtual Private Network (VPN) server.

16. The router device according to claim 10, wherein the device information of the terminal device comprises a hardware model of a network component, firmware information of a network component, brand information of a network component, and a network performance indicator, or a combination thereof.

17. The router device according to claim 10, wherein the application information of the terminal device comprises an execution application list, an application category, a packet destination of the application, or a combination thereof.

18. The router device according to claim 10, wherein the processor is configured to:

collect network environment information of the terminal device; and configure the QoS setting and the MLO mode of the virtual local area network according to the network environment information, the device information and the application information of the terminal device.

* * * * *